(12) United States Patent
Mo et al.

(10) Patent No.: US 12,715,116 B2
(45) Date of Patent: Aug. 25, 2026

(54) OBJECT GRASPING METHOD, APPARATUS, COMPUTER DEVICE AND STORAGE MEDIUM

(71) Applicant: Beijing Youzhuju Network Technology Co., Ltd., Beijing (CN)

(72) Inventors: Yuchen Mo, Beijing (CN); Hanbo Zhang, Beijing (CN); Tao Kong, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/100,541

(22) PCT Filed: Nov. 16, 2023

(86) PCT No.: PCT/CN2023/132005

§ 371 (c)(1),
(2) Date: Jan. 31, 2025

(87) PCT Pub. No.: WO2024/104424

PCT Pub. Date: May 23, 2024

(65) Prior Publication Data

US 2026/0048503 A1 Feb. 19, 2026

(30) Foreign Application Priority Data

Nov. 17, 2022 (CN) ......................... 202211460472.6

(51) Int. Cl.
*B25J 9/16* (2006.01)

(52) U.S. Cl.
CPC ........... *B25J 9/1612* (2013.01); *B25J 9/1697* (2013.01)

(58) Field of Classification Search
CPC .............................. B25J 9/1612; B25J 9/1697
See application file for complete search history.

(56) References Cited

U.S. PATENT DOCUMENTS

2022/0016765 A1 1/2022 Ku et al.
2022/0310095 A1* 9/2022 Gao ..................... G06V 40/174
(Continued)

FOREIGN PATENT DOCUMENTS

CA 3106998 A 7/2022
CN 111383246 A 7/2020
(Continued)

OTHER PUBLICATIONS

International Patent Application No. PCT/CN2023/132005; Int'l Written Opinion and Search Report; dated Dec. 21, 2023; 6 pages.
(Continued)

*Primary Examiner* — Jay Khandpur
(74) *Attorney, Agent, or Firm* — BakerHostetler

(57) ABSTRACT

The present disclosure provides an object grasping method, an apparatus, a computer device and a storage medium, the method includes: in response to receiving a target object grasping instruction, determining a second confidence of each of candidate objects being a target object based on state description information of the target object and a first confidence of each of the candidate objects in a current scene having each preset state; determining a target candidate object and a reward information after performing each preset action for the target candidate object based on the first confidence and the second confidence; and determining a target preset action to be performed based on the reward information, and performing the target preset action.

15 Claims, 4 Drawing Sheets

In response to receiving a target object grasping instruction, determining a second confidence of each of candidate objects being a target object based on state description information of the target object included in the target object grasping instruction and a first confidence of each of the candidate objects in a current scene having each preset state — S101

Determining a target candidate object and a reward information after performing each preset action for the target candidate object based on the second confidence and the first confidence corresponding to each of the candidate objects, the preset action including grasping the target candidate object and asking a question — S102

Determining a target preset action to be performed based on the reward information corresponding to each preset action, and performing the target preset action for the target candidate object — S103

(56) References Cited

U.S. PATENT DOCUMENTS

| | | | | |
|---|---|---|---|---|
| 2023/0116896 | A1* | 4/2023 | Hamilton | B25J 9/1612 701/50 |
| 2024/0037758 | A1 | 2/2024 | Jiang et al. | |
| 2024/0415370 | A1* | 12/2024 | Mintz | G06T 7/32 |

FOREIGN PATENT DOCUMENTS

| | | | |
|---|---|---|---|
| CN | 111553949 | A | 8/2020 |
| CN | 112150349 | A | 12/2020 |
| CN | 112288809 | A | 1/2021 |
| CN | 112633384 | A | 4/2021 |
| CN | 113344055 | A | 9/2021 |
| CN | 113538576 | A | 10/2021 |
| CN | 114397817 | A | 4/2022 |
| CN | 114495109 | A | 5/2022 |
| CN | 114918944 | A | 8/2022 |
| CN | 115070757 | A | 9/2022 |
| CN | 115213890 | A | 10/2022 |
| CN | 115713514 | A | 2/2023 |
| WO | WO 2022/127876 | A1 | 6/2022 |

OTHER PUBLICATIONS

Yang et al.; "Interactive Robotic Grasping with Attribute-Guided Disambiguation"; arXiv:2203.08037; Mar. 2022; 7 pages.
Zhou et al.; "Detecting Twenty-thousand Classes using Image-level Supervision"; arXiv:2201.02605; Jul. 2022; 27 pages.
Radford et al.; "Learning Transferable Visual Models From Natural Language Supervision"; arXiv:2103.00020; Feb. 2021; 48 pages.
Subramanian et al.; "ReCLIP: A Strong Zero-Shot Baseline for Referring Expression Comprehension"; 60th Annual Meeting of the Association for Computational Linguistics; vol. 1; May 2022; p. 5198-5215.
Kaelbling et al.; "Planning and acting in partially observable stochastic domains"; Artificial Intelligence; vol. 101; 1998; p. 99-134.
Yu et al.; "MAttNet: Modular Attention Network for Referring Expression Comprehension"; arXiv:1801.08186; Mar. 2018; 15 pages.
Explosion / spaCy; https://github.com/explosion/spaCy; GitHub Inc .; © 2025; accessed May 30, 2025; 6 pages.
China Patent Application No. 202211460472.6; Office Action; dated Nov. 26, 2025; 14 pages.
China Patent Application No. 202211460472.6; Notice of Registration; dated Mar. 2, 2026; 10 pages.
Zhao Di et al.; "Human-machine Interaction Intention Recognition Technology Based on D-S Evidence Theory"; Modular Machine Tool & Automatic Manufacturing Technique; No. 3; Mar. 2019; p. 60-63 (contains English Abstract).
Jia Zhao et al.; "An Efficient Detection Method for Maneuvering Target with Multiple Motion Models"; 13th Global Symposium on Millimeter—Waves and Terahertz; May 2021; 3 pages.
Kroemer et al.; Active Exploration for Robot Parameter Selection in Episodic Reinforcement Learning; IEEE Symposium on Adaptive Dynamic Programming and Reinforcement Learning; Apr. 2011; 7 pages.
Zhang Hanbo et al.; "Robotic grasping in multi-object stacking scenes based on visual reasoning"; Science China Press, No. 12; Nov. 2018; p. 1341-1356 (contains English Abstract on p. 1356).
European Patent Application No. 23890854.5; Extended Search Report; dated May 29, 2026; 15 pages.
Zhang et al.; "INVIGORATE: Interactive Visual Grounding and Grasping in Clutter"; arXiv:2108.11092; Aug. 2021; 11 pages.

* cited by examiner

OBJECT GRASPING METHOD, APPARATUS, COMPUTER DEVICE AND STORAGE MEDIUM

CROSS REFERENCE TO RELATED APPLICATIONS

The present application is a U.S. National Stage application under 35 U.S.C. § 371 of International Application No. PCT/CN2023/132005, filed on Nov. 16, 2023, which claims priority to Chinese Application No. 2022114604726, filed on Nov. 17, 2022, entitled "OBJECT GRASPING METHOD, APPARATUS, COMPUTER DEVICE AND STORAGE MEDIUM", the disclosure of both applications are incorporated by reference herein in their entireties.

TECHNICAL FIELD

The present disclosure relates to the technical field of artificial intelligence, and in particular, to an object grasping method, an apparatus, a computer device and a storage medium.

BACKGROUND

With the development of science and technology, service robots gradually appear in people's daily life. Some robots usually have the ability of dialog disambiguation, and after the user gives an instruction to the robot, the robot can actively ask the user a question when it is confused about the user's instruction, and determine the meaning in the instruction by combining the user's answer and successfully complete the user's task.

SUMMARY

The embodiments of the present disclosure at least provide an object grasping method, an apparatus, a computer device and a storage medium.

In a first aspect, an embodiment of the present disclosure provides an object grasping method, including: in response to receiving a target object grasping instruction, determining a second confidence of each of candidate objects being a target object based on state description information of the target object included in the target object grasping instruction and a first confidence of each of the candidate objects in a current scene having each preset state;

determining a target candidate object and a reward information after performing each preset action for the target candidate object based on the second confidence and the first confidence corresponding to each of the candidate objects, the preset action including grasping the target candidate object and asking a question; and determining a target preset action to be performed based on the reward information corresponding to each preset action, and performing the target preset action for the target candidate object.

In an optional implementation, the first confidence of the candidate object having each preset state includes: a third confidence of the candidate object having each preset feature attribute, a fourth confidence of the candidate object being located in different preset position areas, and a fifth confidence of the candidate object having each preset position relationship with the rest each of the candidate objects.

In an optional implementation, the third confidence is obtained by:

segmenting a two-dimensional scene image corresponding to the current scene to obtain an image area corresponding to each of the candidate objects; and determining the third confidence of the candidate object having each preset feature attribute based on a first similarity between the image area corresponding to the candidate object and description information of each preset feature attribute.

In an optional implementation, the fourth confidence is obtained by:

acquiring the two-dimensional scene image corresponding to the current scene; and determining the fourth confidence of the candidate object being located in each preset position area based on an overlap area between a position range of the candidate object in the two-dimensional scene image and each preset position area in the two-dimensional scene image.

In an optional implementation, the fifth confidence is obtained by:

determining a shortest distance vector between each of the candidate objects and the rest each of the candidate objects based on three-dimensional position information of each of the candidate objects in a three-dimensional scene image corresponding to the current scene; and determining the fifth confidence of the candidate object having each preset position relationship with the rest each of the candidate objects based on a projection length of the shortest distance vector in each preset direction.

In an optional implementation, the determining the second confidence of each of the candidate objects being the target object based on the state description information of the target object included in the target object grasping instruction and the first confidence of each of the candidate objects in the current scene having each preset state includes:

determining a sixth confidence of each of the candidate objects being the target object based on a target feature attribute included in the state description information of the target object and the third confidence of each of the candidate objects having the target feature attribute;

determining a seventh confidence of the state description information of the target object including a target preset position area based on a second similarity between the state description information of the target object and standard position area description information corresponding to each preset position area, and determining an eighth confidence of each of the candidate objects being the target object based on the seventh confidence and the fourth confidence of each of the candidate objects being located in the target preset position area;

determining a ninth confidence of the state description information of the target object including a target candidate object based on a third similarity between the state description information of the target object and standard candidate object description information corresponding to each of the candidate objects, determining a tenth confidence of the state description information of the target object including a target preset position relationship based on a fourth similarity between the state description information of the target object and standard position relationship description information corresponding to each preset position relationship, and determining an eleventh confidence of each of the candidate objects being the target object based on the ninth confidence, the tenth confidence and the fifth confidence of each of the candidate objects having the target preset position relationship with the rest each of the candidate objects; and determining the second confidence of each of the candidate objects being the target object based on the sixth confidence, the eighth confidence and the eleventh confidence.

In an optional implementation, the asking a question includes asking a question for the target candidate object, the asked question including feature attribute description information of a reference feature attribute, the question being determined by:

filtering out the reference feature attribute from each preset feature attribute based on a twelfth confidence of each preset feature attribute pointing to the target candidate object and the third confidence of the target candidate object having each preset feature attribute; and generating a question including the feature attribute description information of the reference feature attribute.

In an optional implementation, the target preset action includes asking a question, the asking a question including asking a question for the target object; and after performing the target preset action, the method further includes:

in response to receiving answer information for the question, determining a fifth similarity between the received answer information and each preset answer information;

updating the first confidence of each of the candidate objects in the current scene having each preset state based on the fifth similarity; and updating the second confidence of each of the candidate objects being the target object based on the updated first confidence.

In an optional implementation, the target preset action includes asking a question, the asking a question including asking a question for the target object; and after performing the target preset action, further including:

in response to receiving supplementary description information for the question, updating the second confidence of each of the candidate objects being the target object based on the supplementary description information and the first confidence, and returning to a step of determining the reward information.

In a second aspect, an embodiment of the present disclosure further provides an object grasping apparatus, including:

a first determination module, configured to, in response to receiving a target object grasping instruction, determine a second confidence of each of candidate objects being a target object based on state description information of the target object included in the target object grasping instruction and a first confidence of each of the candidate objects in a current scene having each preset state;

a second determination module, configured to determine a target candidate object and a reward information after performing each preset action for the target candidate object based on the second confidence and the first confidence corresponding to each of the candidate objects, the preset action including grasping the target candidate object and asking a question; and a third determination module, configured to determine a target preset action to be performed based on the reward information corresponding to each preset action, and perform the target preset action for the target candidate object.

In a third aspect, an embodiment of the present disclosure further provides a computer device, including: a processor, a memory and a bus, the memory has a machine-readable instruction executable by the processor stored thereon, the processor communicates with the memory through the bus when the computer device is running, and the machine-readable instruction, when executed by the processor, executes the steps in the first aspect or any possible implementation in the first aspect.

In a fourth aspect, an embodiment of the present disclosure further provides a computer-readable storage medium having a computer program stored thereon, the computer program, when run by a processor, executes the steps in the first aspect or any possible implementation in the first aspect.

In order to make the above objects, features and advantages of the present disclosure more comprehensible, preferred embodiments are described in detail below in conjunction with the drawings.

BRIEF DESCRIPTION OF THE DRAWINGS

In order to illustrate the technical solutions of the embodiments of the present disclosure more clearly, the drawings that need to be used in the description of the embodiments will be briefly described below. The drawings herein are incorporated into and constitute a part of the specification, and these drawings illustrate the embodiments consistent with the present disclosure, and are used in conjunction with the specification to illustrate the technical solutions of the present disclosure. It should be understood that the following drawings only illustrate some embodiments of the present disclosure, and therefore should not be considered as limiting the scope. For those of ordinary skill in the art, other related drawings can be obtained according to these drawings without paying creative efforts.

DETAILED DESCRIPTION OF EMBODIMENTS

Figure 1:
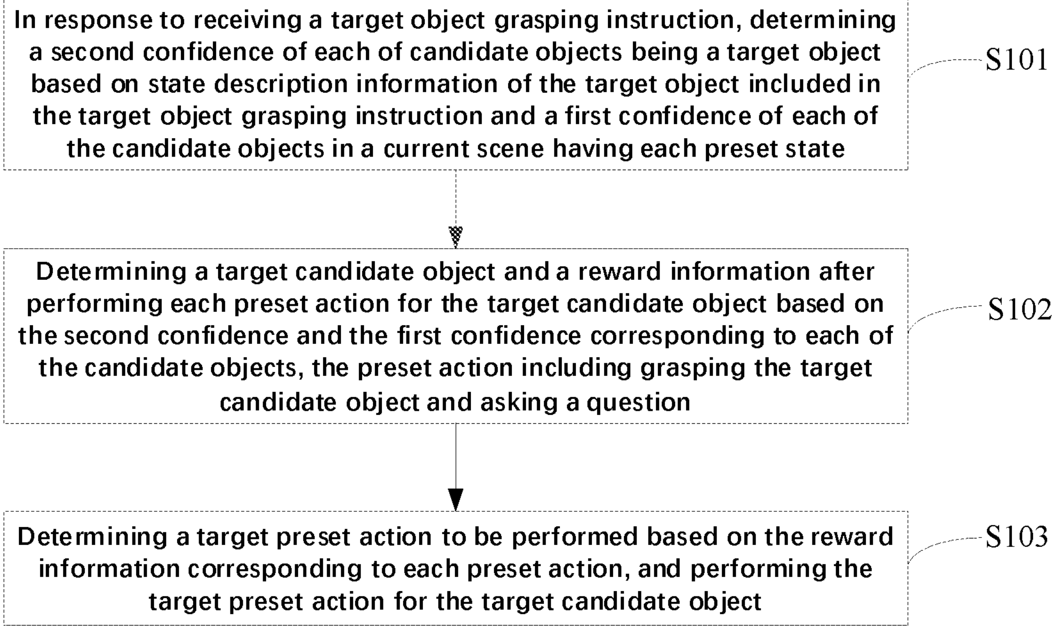
FIG. 1 is a flowchart of an object grasping method provided by an embodiment of the present disclosure.

In order to make the objects, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are only a part of the embodiments of the present disclosure, rather than all of the embodiments. Usually, the components of the embodiments of the present disclosure described and illustrated in the drawings herein can be arranged and designed in various different configurations.

Therefore, the following detailed description of the embodiments of the present disclosure provided in the drawings is not intended to limit the scope of the claimed disclosure, but only represents selected embodiments of the present disclosure. Based on the embodiments of the present disclosure, all other embodiments obtained by those skilled in the art without creative efforts fall within the protection scope of the present disclosure.

In a process of dialog disambiguation between a robot and a user, after the user gives an instruction to the robot, the robot can actively ask the user a question when it is confused about the user's instruction, and determine the meaning in the instruction by combining the user's answer and successfully complete the user's task.

However, usually, the robot only executes pre-trained tasks or processes pre-trained instructions, and it is difficult for the robot to complete a task when an untrained task or instruction occurs. In addition, in a scenario where attributes of objects are similar, disambiguation ability of the robot is degraded, and it is prone to a case where the robot identifies a plurality of objects one by one. Therefore, in the above cases, a success rate and efficiency of task execution of the robot are low.

Based on this, the present disclosure provides an object grasping method, including: in response to receiving a target object grasping instruction, determining a second confidence of each of candidate objects being a target object based on state description information of the target object included in the target object grasping instruction and a first confidence of each of the candidate objects in a current scene having each preset state; determining a target candidate object and a reward information after performing each preset action for the target candidate object based on the second confidence and the first confidence corresponding to each of the candidate objects, the preset action including grasping the target candidate object and asking a question; and determining a target preset action to be performed based on the reward information corresponding to each preset action, and performing the target preset action for the target candidate object.

In the above process, the robot can analyze a probability of each of the candidate objects in the current scene being the target object, which realizes that the target candidate object that meets the requirements of the user can be determined more accurately without pre-training the robot, and improves the accuracy of task execution; and the optimal target preset action can be determined according to the reward information after performing each preset action, which can not only reduce the number of conversations with the user, but also grasp the target object designated by the user as soon as possible, and improve the success rate and efficiency of task execution.

For the defects of the above solutions and the proposed solutions, they are all results obtained by the inventors after practice and careful study. Therefore, the discovery process of the above problems and the solutions to the above problems proposed by the present disclosure in the following should be contributions of the inventors to the present disclosure in the process of the present disclosure.

It should be noted that similar symbols and letters in the following drawings represent similar items, therefore, once an item is defined in a drawing, it does not need to be further defined or explained in subsequent drawings.

It can be understood that before using the technical solutions disclosed in the embodiments of the present disclosure, the user should be informed of the type, range of use, use scenarios, etc. of personal information involved in the present disclosure and obtain the user's authorization in an appropriate manner in accordance with relevant laws and regulations.

In order to facilitate understanding of this embodiment, an object grasping method disclosed in an embodiment of the present disclosure is introduced in detail first. An execution subject of the object grasping method provided by the embodiment of the present disclosure is generally a computer device with a certain computing power. The object grasping method provided by the embodiment of the present disclosure can be applied to a scenario where a user instructs a robot to grasp a target object. A computer device for executing the object grasping method may be provided inside a robot for grasping the target object. A grasping apparatus for grasping the target object may also be provided in the robot, and after determining a target candidate object to be grasped from candidate objects, the internal computer device may instruct the grasping apparatus to grasp the target candidate object.

Referring to FIG. 1, which is a flowchart of an object grasping method provided by an embodiment of the present disclosure, the method includes S101-S103, where:

S101: in response to receiving a target object grasping instruction, determine a second confidence of each of candidate objects being a target object based on state description information of the target object included in the target object grasping instruction and a first confidence of each of the candidate objects in a current scene having each preset state.

In the embodiment of the present disclosure, the target object grasping instruction may be a voice instruction for grasping a target object given by a user to the robot according to a current scene. The target object grasping instruction may include state description information of the target object. Specifically, the state description information may include at least one of information such as a feature attribute (e.g., name, color, shape, size, category, etc.) inherent of the target object, a position area of the target object in the current scene, a position relationship between the target object and other candidate objects in the current scene, and the like.

The robot can acquire a scene picture of the current scene. The scene picture of the current scene acquired by the robot may include at least one candidate object. Exemplarily, the current scene is a scene including a table surface, and the scene picture of the table surface acquired by the robot may include items such as a pliers, a wrench, a screwdriver, a hammer, etc. placed on the table surface.

In an implementation, the robot can, before the user gives the target object grasping instruction, acquire the scene picture of the current scene through an image acquisition device and determine the first confidence of each of the candidate objects in the current scene having each preset state.

Here, the preset state may include: having a preset feature attribute, being located in a preset position area in the scene picture of the current scene, and having a preset position relationship between the candidate object and the rest each candidate object.

Figure 2:
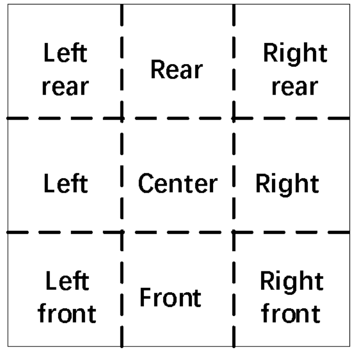
FIG. 2 is a schematic diagram of a scene picture of a current scene provided by an embodiment of the present disclosure.
Figure 3:
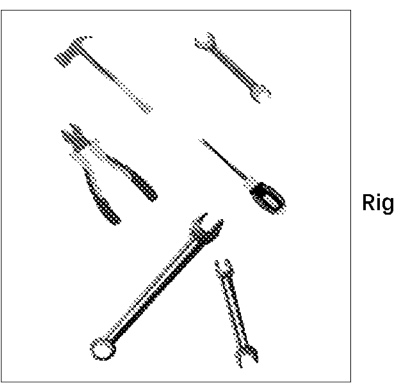
FIG. 3 is a schematic diagram of another scene picture of a current scene provided by an embodiment of the present disclosure.

The preset feature attribute may include at least one of a name, a color, a shape, a size, a category, and the like. In an implementation, the scene picture in the current scene may be divided into a plurality of position areas according to a preset rule. Exemplarily, the scene picture of the current scene may be divided into a plurality of position areas such as front, rear, left, right, center, front left, front right, rear left, and rear right as shown in FIG. 2. The preset position area may include at least one of a plurality of position areas. The position relationship between the candidate object and the rest each candidate object may be represented by azimuth information of the candidate object being located with respect to the rest each reference object, with the rest each candidate object as a reference object. Generally, for a candidate object stationarily placed on a plane, the azimuth information of the candidate object being located with respect to other each reference object may refer to azimuth information in a two-dimensional coordinate system where the plane is located. As shown in a schematic diagram of another scene picture of a current scene in FIG. 3, the hammer is located on the left of the double open-ended wrench, behind the pliers, and at the left rear of the screwdriver. In other cases, for example, when the candidate object is hanging in target space, the azimuth information of the candidate object being located with respect to the rest each reference object may also refer to azimuth information in a three-dimensional space coordinate system.

The first confidence of the candidate object having each preset state may include: a third confidence of the candidate object having each preset feature attribute, a fourth confidence of the candidate object being located in different preset position areas, and a fifth confidence of the candidate object having each preset position relationship with the rest each of the candidate objects.

In an implementation, the third confidence of the candidate object having each preset feature attribute may be obtained by:

Step a1: segmenting a two-dimensional scene image corresponding to the current scene to obtain an image area corresponding to each of the candidate objects.

Here, an image acquisition device may be used to acquire an image of the current scene, so as to obtain a two-dimensional scene image corresponding to the current scene. The two-dimensional scene image here may be a red green blue (Red Green Blue, RGB) image. In an implementation, a detector (Detic) in a pre-trained vision-language model may be used to detect a candidate object in the two-dimensional scene image, and determine a probability that each candidate object belongs to each category. Then the two-dimensional scene image is segmented to obtain an image area corresponding to each candidate object.

Step a2: determining the third confidence of the candidate object having each preset feature attribute based on a first similarity between the image area corresponding to the candidate object and description information of each preset feature attribute.

Here, the description information of the preset feature attribute may be text information that describes the image area with the preset feature attribute. Exemplarily, the description information of the preset feature attribute may be "a picture of red pliers", "a picture of yellow pliers", . . . , "a picture of blue pliers".

The first similarity between the image area corresponding to the candidate object and the description information of each preset feature attribute may be determined first. In an implementation, the image area corresponding to the candidate object and the description information of each preset feature attribute may be input into a Contrastive Language-Image Pre-Training (CLIP) model, and the first similarity between the image area corresponding to the candidate object and the description information of each preset feature attribute may be output.

Then, for each preset feature attribute, the first similarity between the image area corresponding to each candidate object and the description information of the preset feature attribute corresponding to the preset feature attribute may be normalized to obtain the third confidence of the candidate object having the preset feature attribute. Here, the higher the first similarity between the image area corresponding to the candidate object and the description information of the preset feature attribute corresponding to a certain preset feature attribute, the higher the third confidence of the candidate object having the preset feature attribute.

Generally, in order to describe the third confidence of the candidate object having each preset feature attribute more clearly, in an implementation, a preset feature attribute (such as color) may be selected, and then the first similarity between the image area corresponding to the candidate object and the description information of the preset feature attribute corresponding to different preset feature attribute values (such as red, yellow, blue, etc.) under that preset feature attribute may be determined, and then the third confidence of the candidate object having each preset feature attribute value under that preset feature attribute may be determined. For example, a third confidence of the candidate object having the color of red, a third confidence of the candidate object having the color of yellow, and a third confidence of the candidate object having the color of blue.

In an implementation, the fourth confidence of the candidate object being located in different preset position areas may be determined by:

Step b1: acquiring the two-dimensional scene image corresponding to the current scene.

Here, an image acquisition device may also be used to acquire an image of the current scene, so as to obtain the two-dimensional scene image corresponding to the current scene. The two-dimensional scene image here may also be an RGB image.

Step b2: determining the fourth confidence of the candidate object being located in each preset position area based on an overlap area between a position range of the candidate object in the two-dimensional scene image and each preset position area in the two-dimensional scene image.

Here, the position range of the candidate object in the two-dimensional scene image may refer to a position range of a bounding box of the candidate object in the two-dimensional scene image. Here, a plane coordinate system may be established in the two-dimensional scene image, and then the position range of the bounding box of the candidate object in the plane coordinate system may be determined. Based on the position range of the bounding box of the candidate object in the plane coordinate system and each preset position area, the overlap area between the two may be determined.

Then, for each preset position area, the overlap area between the position range of each candidate object in the two-dimensional scene image and the preset position area are normalized, so as to obtain the fourth confidence of the candidate object being located in the preset position area. Here, the larger the overlap area between the position range of the candidate object in the two-dimensional scene image and a certain preset position area, the higher the fourth confidence of the candidate object being located in the preset position area.

In an implementation, the fifth confidence of the candidate object having each preset position relationship with the rest each of the candidate objects may be determined by:

Step c1: determining a shortest distance vector between each of the candidate objects and the rest each of the candidate objects based on three-dimensional position information of each of the candidate objects in a three-dimensional scene image corresponding to the current scene.

Here, an image acquisition device may be used to acquire a two-dimensional scene image and a depth scene image corresponding to the current scene. Then, the three-dimensional scene image corresponding to the current scene is obtained by using the two-dimensional scene image and the depth scene image.

Here, the three-dimensional position information of the candidate object may refer to point cloud information formed by three-dimensional coordinates of each point on the candidate object. The shortest distance vector may refer to a vector between two points with the shortest distance from one candidate object to another candidate object.

For each candidate object, the shortest distance vector between the candidate object and the rest each candidate object may be obtained according to the point cloud information of the candidate object and the point cloud information of the rest each candidate object.

Step c2: determining the fifth confidence of the candidate object having each preset position relationship with the rest each of the candidate objects based on a projection length of the shortest distance vector in each preset direction.

Here, the preset direction may refer to a direction on a two-dimensional plane, such as preset directions such as front, rear, left, and right. For each candidate object, the shortest distance vector between the candidate object and the rest each candidate object is projected in each preset direction, and the projection length of the shortest distance vector in each preset direction may be obtained.

For each preset direction, the projection length of the shortest distance vector between each candidate object and the rest each candidate object in the preset direction is normalized, so as to obtain the fifth confidence of the candidate object having the preset position relationship with the rest each of the candidate objects. Here, the longer the projection length of the shortest distance vector between the candidate object and the rest each candidate object in the preset direction, the higher the fifth confidence of the candidate object having the preset position relationship with the rest each of the candidate objects.

The first confidence of each of the candidate objects in the current scene having each preset state obtained from the above process may be used to determine the second confidence of each of the candidate objects being the target object after receiving the target object grasping instruction given by the user.

In an implementation, after receiving the target object grasping instruction given by the user, the state description information of the target object included in the target object grasping instruction may be split according to a syntax tree to obtain state description information including three parts: a target feature attribute of the target object, a target position area in which the target object is located, and a target position relationship between the target object and the rest each candidate object. Then, for the above three parts of state description information, the second confidence of each of the candidate objects being the target object may be determined separately, which may be performed specifically according to the steps of d1-d4.

Step d1: for the target feature attribute of the target object, a sixth confidence of each of the candidate objects being the target object may be determined based on the target feature attribute included in the state description information of the target object and the third confidence of each of the candidate objects having the target feature attribute.

In a manner, the CLIP model may be used to determine the sixth confidence of each of the candidate objects being the target object. The state description information including the target feature attribute of the target object may be represented by $e_{self}$. Each of the candidate objects may be represented by $x_i$, where i is a positive integer. Inputting the state description information including the target feature attribute of the target object and each of the candidate objects into the CLIP model, an output result $CLIP(e_{self}, x_i)$ of the CLIP may be obtained, and then it may be determined that the sixth confidence of each of the candidate objects being the target object is: $P(e_{self}|x_i) \propto CLIP(e_{self}, x_i)$.

Step d2: for the target position area in which the target object is located, a seventh confidence of the state description information of the target object including a target preset position area may be determined based on a second similarity between the state description information of the target object and standard position area description information corresponding to each preset position area, and an eighth confidence of each of the candidate objects being the target object may be determined based on the seventh confidence and the fourth confidence of each of the candidate objects being located in the target preset position area.

Here, accuracy of the state description information of the target object including a target preset position area may be determined first, that is, based on the second similarity between the state description information of the target object and the standard position area description information corresponding to each preset position area, the seventh confidence of the state description information of the target object including a target preset position area may be determined. The seventh confidence may characterize a probability that the target position area described by the user in the state description information is a certain preset position area.

The seventh confidence of the state description information of the target object including a target preset position area may be represented by $L(p_i, e_{loc})$; $p_i$ represents each preset position area; and $e_{loc}$ represents the state description information of the target object included in the target object grasping instruction given by the user. The fourth confidence of each of the candidate objects being located in the target preset position area may be represented by $P(p_i|x_i)$. The eighth confidence of each of the candidate objects being the target object may be represented as:

$$P(e_{loc} \mid x_i) \propto \sum_{pi} L(p_i, e_{loc}) P(p_i \mid x_i)$$

Step d3: for the target position relationship between the target object and the rest each candidate object, a ninth confidence of the state description information of the target object including a target preset position relationship may be determined based on a third similarity between the state description information of the target object and standard position relationship description information corresponding to each preset position relationship; a tenth confidence of each of the candidate objects being the target object may be determined based on the ninth confidence and the fifth confidence of each of the candidate objects having the target preset position relationship with the rest each of the candidate objects.

Here, accuracy of the candidate object being included in the state description information of the target object may be determined, that is, based on the third similarity between the state description information of the target object and the standard position relationship description information corresponding to each candidate object, the ninth confidence of the state description information of the target object including the candidate object may be determined. The ninth confidence may characterize a probability that the target object described by the user in the state description information is a certain candidate object. Here, accuracy of the target preset position relationship being included in the state description information of the target object may also be determined, that is, based on the fourth similarity between the state description information of the target object and the standard position relationship description information corresponding to each preset position relationship, the tenth confidence of the state description information of the target object including the target preset position relationship may be determined. The tenth confidence may characterize a probability that the target position relationship described by the user in the state description information is a certain preset position relationship.

The ninth confidence of the state description information of the target object including the candidate object may be represented by $P(x_j|e_{rel})$; $x_j$ represents the target object described by the user, where j is a positive integer; and $e_{rel}$ represents the state description information of the target object included in the target object grasping instruction given by the user. The tenth confidence of the state description information of the target object including the target preset position relationship may be represented by $L(r_{i,j}, e_{rel})$; $r_{i,j}$ represents the target preset position relationship, where i is a positive integer. The fifth confidence of each of the candidate objects having the target preset position relationship with the rest each of the candidate objects is $P(r_{i,j}|x_i,x_j)$. The eleventh confidence of each of the candidate objects being the target object may be represented as:

$$P(e_{rel} \mid x_i) \propto \sum_{x_j} P(x_j \mid e_{rel}) \sum_{r_{i,j}} L(r_{i,j}, e_{rel}) P(r_{i,j} \mid x_i, x_j)$$

Step d4: finally, the second confidence of each of the candidate objects being the target object is determined based on the sixth confidence, the eighth confidence and the eleventh confidence.

Here, the second confidence of each of the candidate objects being the target object may be represented as: $P(x_i|e) \propto P(x_i)P(e_{self}|x_i)P(e_{rek}|x_i)P(e_{rel}|x_i)$, where e represents the state description information of the target object included in the target object grasping instruction; and $P(x_i)$ represents the probability that each of the candidate objects belongs to each category.

S102: determining a target candidate object and a reward information after performing each preset action for the target candidate object based on the first confidence corresponding to each of the candidate objects, and the second confidence, the preset action including grasping the target candidate object and asking a question. Here, in a decision-making module, the target candidate object that may meet the requirements of the user and the reward information after performing each preset action for the target candidate object may be determined in combination with the pre-determined first confidence corresponding to each of the candidate objects and the obtained second confidence.

Here, a Partially Observable Markov Decision Processes (POMDP) framework may be used for decision-making. The preset action may include grasping the target candidate object and asking a question. The asking a question may include asking a question for the target candidate object and asking a question for the target object.

The reward information is used to guide the robot to make the best decision, so as to grasp the target object instructed by the user in the shortest time. Different reward information may be set for different preset actions. Exemplarily, in an instance that the robot grasps the target object, the obtained reward information is +10 points; in an instance that the robot grasps a wrong object, the obtained reward information is −10 points; and in an instance that the robot asks a question, the obtained reward information is −1 point.

In a specific implementation, different questions may be preset, and preset answer information may be set for different questions.

In an implementation, in an instance that the asking a question includes asking a question for the target candidate object, the question is determined by: filtering out a reference feature attribute from each preset feature attribute based on a twelfth confidence of each preset feature attribute pointing to the target candidate object and the third confidence of the target candidate object having each preset feature attribute; and generating a question including feature attribute description information of the reference feature attribute.

Here, the reference feature attribute may be filtered out from each preset feature attribute in each iteration of question generation. In each iteration of question generation, the reference feature attribute may be filtered out by a maximum product of the twelfth confidence of each preset feature attribute pointing to the target candidate object and the third confidence of the target candidate object having each preset feature attribute.

In the next iteration of question generation, the reference feature attribute with the largest product of the twelfth confidence of each preset feature attribute pointing to the target candidate object and the third confidence of the target candidate object having each preset feature attribute continues to be filtered out from the remaining preset feature attributes.

Here, the reference feature attribute filtered out each time may be represented by $a_t$, $a_t = \mathrm{argmax}_{a_i} P(x_i|a_t, \ldots, a_1)P(a_t|x_i)$, where $P(x_i|a_t, \ldots, a_1)$ represents the twelfth confidence of each preset feature attribute pointing to the target candidate object, and $P(a_t|x_i)$ represents the third confidence of the target candidate object having each preset feature attribute.

S103: determining a target preset action to be performed based on the reward information corresponding to each preset action, and performing the target preset action for the target candidate object.

In an instance that the determined target preset action is grasping the target candidate object, if the target candidate object is the target object, the grasping task is successful and the task ends; if the target candidate object is not the target object, the grasping task fails, and the user can reissue the target object grasping instruction or end the task.

In an instance that the determined target preset action is asking a question, the asking a question may include asking a question for the target candidate object and asking a question for the target object.

In an instance that the asking a question includes asking a question for the target candidate object, it may be determined whether the target candidate object is the target object according to the answer information of the user, and the target candidate object is grasped in an instance that the target candidate object is determined to be the target object.

In an instance that the asking a question includes asking a question for the target object, the user may answer the question, that is, give answer information, or may give supplementary description information. For example, the question is “do you want a blue box”, and the user may answer “no, I want a red box”, where “no” represents the answer information for the question, and “I want a red box” represents the supplementary description information for the question. Here, the robot may process the answer information and the supplementary description information separately.

In an implementation, after performing the target preset action, in response to receiving answer information for the question, a fifth similarity between the that answer information and each preset answer information may be determined; the first confidence of each of the candidate objects in the current scene having each preset state may be updated based on the fifth similarity; and the second confidence of each of the candidate objects being the target object may be updated based on the updated first confidence.

Here, the determined fifth similarity between the answer information and each preset answer information may be normalized as an update to the first confidence of each of the candidate objects in the current scene having each preset state. After the first confidence is updated, the second confidence of each of the candidate objects being the target object may be updated based on the updated first confidence, and the subsequent steps may continue to be executed until the target object is grasped or the task ends after the number of conversations reaches a certain number.

In an implementation, after performing the target preset action, in response to receiving supplementary description information for the question, the second confidence of each of the candidate objects being the target object may be updated based on the supplementary description information and the first confidence, and return to the step of determining the reward information.

Receiving the supplementary description information for the question is equivalent to receiving new state description information. Here, the second confidence of each of the candidate objects being the target object may be re-determined, and return to the step of determining the reward information, until the target object is grasped or the task ends after the number of conversations reaches a preset number.

It can be understood by those skilled in the art that in the above methods of specific implementations, the writing order of each step does not mean a strict execution order and does not constitute any limitation on the implementation process, and the specific execution order of each step should be determined by its function and possible internal logic.

Based on the same inventive concept, an embodiment of the present disclosure further provides an object grasping apparatus corresponding to the object grasping method. Since the principle of the apparatus in the embodiment of the present disclosure to solve the problem is similar to the object grasping method in the above embodiment of the present disclosure, the implementation of the apparatus may refer to the implementation of the method, and the repetitions will not be repeated.

Figure 4:
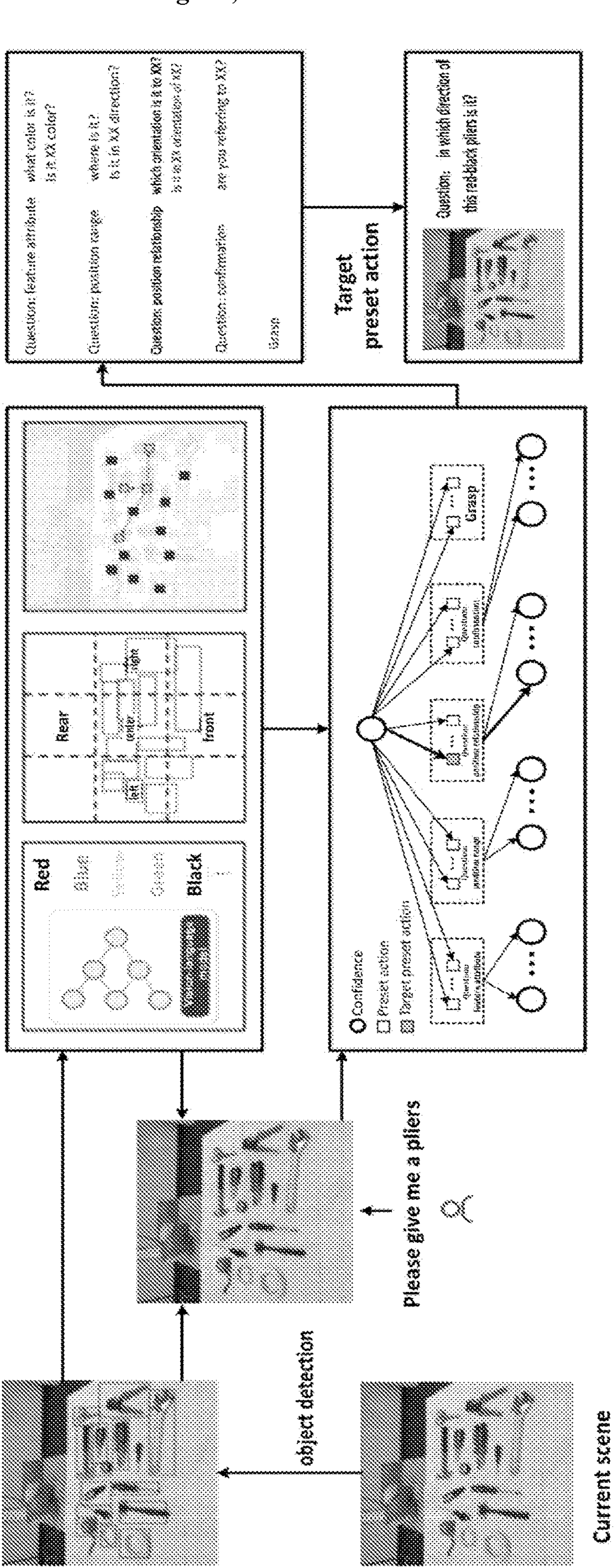
FIG. 4 is a flowchart of another object grasping method provided by an embodiment of the present disclosure.

As shown in FIG. 4, which is a flowchart of another object grasping method. Firstly, a scene image of a current scene is acquired by using a camera in a robot. Specifically, a two-dimensional scene image corresponding to the current scene and a three-dimensional scene image corresponding to the current scene may be acquired. Object detection is performed on the three-dimensional scene image corresponding to the current scene to obtain various candidate objects, and the two-dimensional scene image is segmented for each of the candidate objects to obtain an image area corresponding to each of the candidate objects.

Next, a first confidence of the candidate object having each preset color is determined according to a first similarity between the image area corresponding to the candidate object and each preset color.

A second confidence of the candidate object being located in each preset grid is determined according to an overlap area between a position range of a bounding box of the candidate object and each preset grid area in the two-dimensional scene image.

A shortest distance vector between each of the candidate objects and the rest each of the candidate objects is determined according to point cloud information of each of the candidate objects in the three-dimensional scene image, and then a third confidence of the candidate object having each preset position relationship with the rest each of the candidate objects is determined according to a projection length of the shortest distance vector in each preset direction. Each preset direction here may include directions of front, rear, left, and right in a two-dimensional plane.

The first confidence of the candidate object having each preset color, the second confidence of the candidate object being located in each preset grid, and the third confidence of the candidate object having each preset position relationship with the rest each of the candidate objects may constitute an observation model. The observation model is used for estimating a reward information after the robot performs each preset action in combination with a fourth confidence of each of the candidate objects being a target object after the user issues the target object grasping instruction.

After the user issues the target object grasping instruction, a fourth confidence of each of the candidate objects being the target object may be determined according to the state description information of the target object included in the target object grasping instruction, and the above first confidence, second confidence and third confidence. For example, if the target object grasping instruction issued by the user is “please give me a pliers”, the fourth confidence of each of the candidate objects being “pliers” may be determined according to the above process.

Next, the reward information after the robot performs various preset actions is determined according to the observation model and the fourth confidence of each of the candidate objects being “pliers”. The preset action may include asking a question about an attribute feature (e.g., “what color is it?”, “is it XX color?”), asking a question about a position range (e.g., “where is it?”, “is it in XX orientation?”), asking a question about a position relationship (e.g., “which orientation is it in XX?”, “is it in XX of XX orientation?”), confirming the target candidate object after asking a question, grasping the target candidate object, and the like.

After the robot performs different preset actions, different reward information may be obtained. For example, after asking a question, −1 point may be obtained; after grasping the target candidate object being the target object, +10 points may be obtained; and after grasping the target candidate object not being the target object, −10 points may be obtained.

The robot may determine a target preset action, that is, an optimal preset action, according to the estimated reward information after performing each preset action. Here, it is determined to ask the user a question about the position relationship as the target preset action, and the user may be asked "in which direction of this red-black pliers is it?" according to the preset question.

After the user gives the answer information for the question, the robot may continue to determine the target preset action according to the observation model and the answer information, until it is determined to grasp the target object, or the number of questions reaches a preset number, and the task ends.

Figure 5:
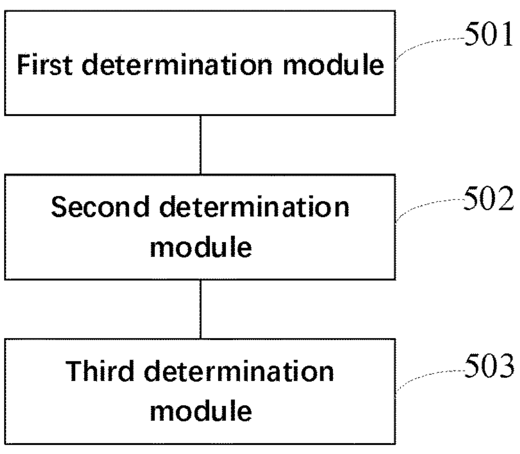
FIG. 5 is an architecture schematic diagram of an object grasping apparatus provided by an embodiment of the present disclosure.

Referring to FIG. 5, which is an architecture schematic diagram of an object grasping apparatus provided by an embodiment of the present disclosure, the apparatus includes:

a first determination module 501, configured to, in response to receiving a target object grasping instruction, determine a second confidence of each of candidate objects being a target object based on state description information of the target object included in the target object grasping instruction and a first confidence of each of the candidate objects in a current scene having each preset state;

a second determination module 502, configured to determine a target candidate object and a reward information after performing each preset action for the target candidate object based on the first confidence corresponding to each of the candidate objects, and the second confidence, the preset action including grasping the target candidate object and asking a question; and a third determination module 503, configured to determine a target preset action to be performed based on the reward information corresponding to each preset action, and perform the target preset action for the target candidate object.

In an optional implementation, the first confidence of the candidate object having each preset state includes: a third confidence of the candidate object having each preset feature attribute, a fourth confidence of the candidate object being located in different preset position areas, and a fifth confidence of the candidate object having each preset position relationship with the rest each of the candidate objects.

In an optional implementation, the apparatus further includes a fourth determination module configured to determine the third confidence.

The fourth determination module is specifically configured to:

segment the two-dimensional scene image corresponding to the current scene to obtain an image area corresponding to each of the candidate objects; and determine the third confidence of the candidate object having each preset feature attribute based on a first similarity between the image area corresponding to the candidate object and description information of each preset feature attribute.

In an optional implementation, the apparatus further includes a fifth determination module configured to determine the fourth confidence.

The fifth determination module is specifically configured to:

acquire the two-dimensional scene image corresponding to the current scene; and determine the fourth confidence of the candidate object being located in the each preset position area based on an overlap area between a position range of the candidate object in the two-dimensional scene image and each preset position area in the two-dimensional scene image.

In an optional implementation, the apparatus further includes a sixth determination module configured to determine the fifth confidence.

The sixth determination module is specifically configured to:

determine a shortest distance vector between each of the candidate objects and the rest each of the candidate objects based on three-dimensional position information of each of the candidate objects in a three-dimensional scene image corresponding to the current scene; and determine the fifth confidence of the candidate object having each preset position relationship with the rest each of the candidate objects based on a projection length of the shortest distance vector in each preset direction.

In an optional implementation, the first determination module 501 is specifically configured to:

determine a sixth confidence of each of the candidate objects being the target object based on a target feature attribute included in the state description information of the target object and the third confidence of each of the candidate objects having the target feature attribute;

determine a seventh confidence of the state description information of the target object including a target preset position area based on a second similarity between the state description information of the target object and standard position area description information corresponding to each preset position area, and determine an eighth confidence of each of the candidate objects being the target object based on the seventh confidence and the fourth confidence of each of the candidate objects being located in the target preset position area;

determine a ninth confidence of the state description information of the target object including a target candidate object based on a third similarity between the state description information of the target object and standard candidate object description information corresponding to each of the candidate objects, determine a tenth confidence of the state description information of the target object including a target preset position relationship based on a fourth similarity between the state description information of the target object and standard position relationship description information corresponding to each preset position relationship, and determine an eleventh confidence of each of the candidate objects being the target object based on the ninth confidence, the tenth confidence and the fifth confidence of each of the candidate objects having the target preset position relationship with the rest each of the candidate objects; and determine the second confidence of each of the candidate objects being the target object based on the sixth confidence, the eighth confidence and the eleventh confidence.

In an optional implementation, the asking a question includes asking a question for the target candidate object, the asked question including feature attribute description information of a reference feature attribute, the apparatus further including a seventh determination module configured to determine the question.

The seventh determination module is specifically configured to:

filter out the reference feature attribute from each preset feature attribute based on a twelfth confidence of each preset feature attribute pointing to the target candidate object and the third confidence of the target candidate object having each preset feature attribute; and generate a question including the feature attribute description information of the reference feature attribute.

In an optional implementation, the target preset action includes the asking a question, the asking a question including asking a question for the target object; and after the step of performing the target preset action, the apparatus includes:

an eighth determination module, configured to, in response to receiving answer information for the question, determine a fifth similarity between the received answer information and each preset answer information;

a first update module, configured to update the first confidence of each of the candidate objects in the current scene having each preset state based on the fifth similarity; and a second update module, configured to update the second confidence of each of the candidate objects being the target object based on the updated first confidence.

In an optional implementation, the target preset action includes the asking a question, the asking a question including asking a question for the target object; and after the step of performing the target preset action, the apparatus includes:

a third update module, configured to, in response to receiving supplementary description information for the question, update the second confidence of each of the candidate objects being the target object based on the supplementary description information and the first confidence, and return to the step of determining the reward information.

For the description of the processing flow of each module in the apparatus and the interaction flow between each module, reference may be made to the related description in the above method embodiments, which will not be described in detail here.

Figure 6:
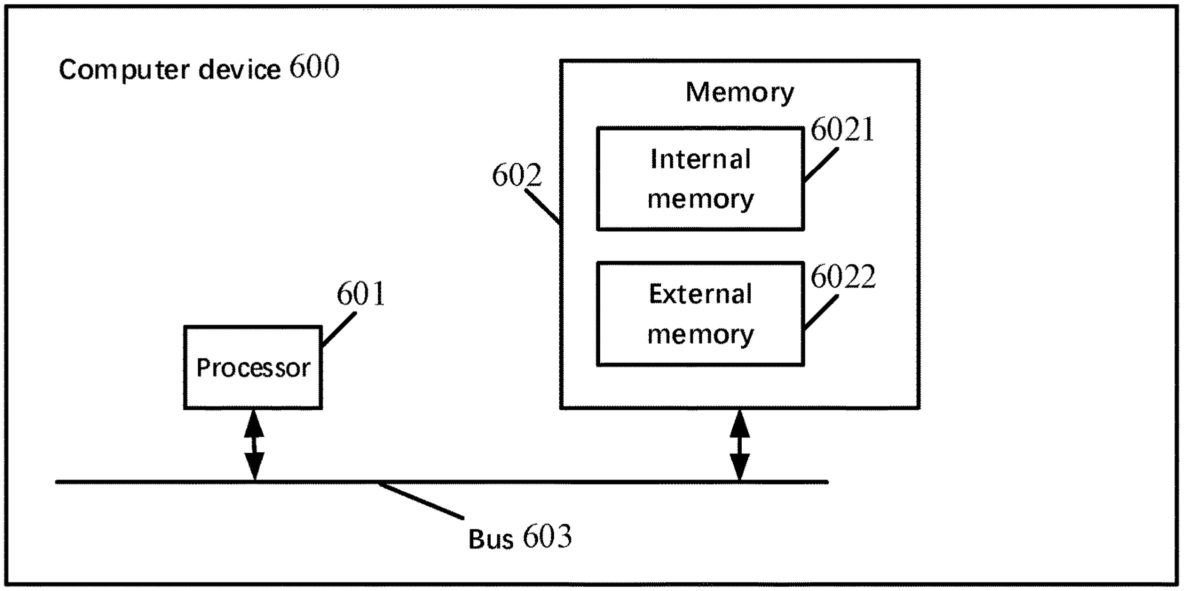
FIG. 6 is a schematic diagram of a computer device provided by an embodiment of the present disclosure.

Based on the same technical concept, an embodiment of the present disclosure further provides a computer device. Referring to FIG. 6, which is a schematic structural diagram of a computer device 600 provided by an embodiment of the present disclosure, including a processor 601, a memory 602, and a bus 603. The memory 602 is configured to store execution instructions, including an internal memory 6021 and an external memory 6022; the internal memory 6021 here is configured to temporarily store operation data in the processor 601 and data exchanged with the external memory 6022 such as a hard disk, and the processor 601 exchanges data with the external memory 6022 through the internal memory 6021. When the computer device 600 is running, the processor 601 communicates with the memory 602 through the bus 603, so that the processor 601 executes the following instructions:

in response to receiving a target object grasping instruction, determine a second confidence of each of candidate objects being a target object based on state description information of the target object included in the target object grasping instruction and a first confidence of each of the candidate objects in a current scene having each preset state;

determine a target candidate object and a reward information after performing each preset action for the target candidate object based on the second confidence and the first confidence corresponding to each of the candidate objects, the preset action including grasping the target candidate object and asking a question; and determine a target preset action to be performed based on the reward information corresponding to each preset action, and perform the target preset action for the target candidate object.

An embodiment of the present disclosure further provides a computer-readable storage medium having a computer program stored thereon, the computer program, when run by a processor, executes the steps of the object grasping method according to the above method embodiments. The storage medium may be a volatile or non-volatile computer-readable storage medium.

An embodiment of the present disclosure further provides a computer program product carrying program code, the instructions included in the program code may be used to execute the steps of the object grasping method described in the above method embodiments, for details, reference may be made to the above method embodiments, which will not be repeated here.

The above computer program product may be specifically implemented by hardware, software, or a combination thereof. In an optional embodiment, the computer program product is embodied as a computer storage medium, and in another optional embodiment, the computer program product is embodied as a software product, such as a software development kit (SDK) and the like.

It can be clearly understood by those skilled in the art that, for the convenience and brevity of description, for the specific working process of the above-described system and apparatus, reference may be made to the corresponding process in the foregoing method embodiment, which will not be repeated here. In several embodiments provided by the present disclosure, it should be understood that the disclosed system, apparatus, and method may be implemented in other ways. The above-described apparatus embodiments are only illustrative. For example, the division of units is only a logical function division, and there may be other division methods in actual implementation. For another example, multiple units or components may be combined or integrated into another system, or some features may be ignored or not executed. In addition, the coupling, direct coupling, or communication connection between each other shown or discussed may be indirect coupling or communication connection through some communication interfaces, and the apparatus or unit, which may be electrical, mechanical, or other forms.

The units described as separate components may or may not be physically separated, and the components shown as units may or may not be physical units, that is, they may be located in one place, or may be distributed to multiple network units. Some or all of the units may be selected according to actual needs to achieve the purpose of the solution of this embodiment.

In addition, the functional units in various embodiments of the present disclosure may be integrated into one processing unit, each unit may also exist physically alone, or two or more units may be integrated into one unit.

If the functions are implemented in the form of software functional units and sold or used as independent products, they can be stored in a non-volatile computer-readable storage medium executable by a processor. Based on this understanding, the technical solutions of the present disclosure in essence, or the parts that contribute to the related art or the parts of the technical solutions may be embodied in the form of software products. The computer software products are stored in a storage medium, including several instructions for causing a computer device (which may be a personal computer, a server, or a network device, etc.) to execute all or part of the steps of the methods described in various embodiments of the present disclosure. The aforementioned storage medium includes: various media that can store program codes, such as a USB flash drive, a mobile hard disk, a Read-Only Memory (ROM), a Random Access Memory (RAM), a magnetic disk, or an optical disk.

Finally, it should be noted that the above embodiments are only specific implementations of the present disclosure, which are used to illustrate the technical solutions of the present disclosure, but not to limit them. The protection scope of the present disclosure is not limited to this. Although the present disclosure has been described in detail with reference to the foregoing embodiments, those of ordinary skill in the art should understand that any person skilled in the art within the technical scope disclosed by the present disclosure can still modify the technical solutions described in the foregoing embodiments or make changes that can be easily thought of, or make equivalent replacements to some of the technical features; and these modifications, changes or replacements do not make the essence of the corresponding technical solutions deviate from the spirit and scope of the technical solutions of the embodiments of the present disclosure, and should be covered by the protection scope of the present disclosure. Therefore, the protection scope of the present disclosure should be based on the protection scope of the claims.

The invention claimed is:

1. An object grasping method, comprising:

in response to receiving a target object grasping instruction, determining a second confidence of each of candidate objects being a target object based on state description information of the target object comprised in the target object grasping instruction and a first confidence of each of the candidate objects in a current scene having each preset state;

determining a target candidate object and a reward information after performing each preset action for the target candidate object based on the second confidence and the first confidence corresponding to each of the candidate objects, the preset action comprising grasping the target candidate object and asking a question; and determining a target preset action to be performed based on the reward information corresponding to each preset action, and performing the target preset action for the target candidate object, wherein the first confidence comprises a third confidence of each candidate object having each preset feature attribute, a fourth confidence of each candidate object being located in different preset position areas, and a fifth confidence of each candidate object having each preset position relationship with each of remaining candidate objects, and wherein the determining the second confidence of each of the candidate objects comprises:

determining a sixth confidence of each of the candidate objects being the target object based on a target feature attribute comprised in the state description information of the target object and the third confidence of each of the candidate objects having the target feature attribute, determining a seventh confidence of the state description information of the target object comprising a target preset position area based on a second similarity between the state description information of the target object and standard position area description information corresponding to each preset position area, and determining an eighth confidence of each of the candidate objects being the target object based on the seventh confidence and the fourth confidence of each of the candidate objects being located in the target preset position area, determining a ninth confidence of the state description information of the target object comprising a target candidate object based on a third similarity between the state description information of the target object and standard candidate object description information corresponding to each of the candidate objects, determining a tenth confidence of the state description information of the target object comprising a target preset position relationship based on a fourth similarity between the state description information of the target object and standard position relationship description information corresponding to each preset position relationship, and determining an eleventh confidence of each of the candidate objects being the target object based on the ninth confidence, the tenth confidence and the fifth confidence of each of the candidate objects having the target preset position relationship with the rest each of the candidate objects, and determining the second confidence of each of the candidate objects being the target object based on the sixth confidence, the eighth confidence and the eleventh confidence.

2. The method according to claim 1, wherein the third confidence is obtained by:

segmenting a two-dimensional scene image corresponding to the current scene to obtain an image area corresponding to each of the candidate objects; and determining the third confidence of the candidate object having each preset feature attribute based on a first similarity between the image area corresponding to the candidate object and description information of each preset feature attribute.

3. The method according to claim 1, wherein the fourth confidence is obtained by:

acquiring the two-dimensional scene image corresponding to the current scene; and determining the fourth confidence of the candidate object being located in the each preset position area based on an overlap area between a position range of the candidate object in the two-dimensional scene image and each preset position area in the two-dimensional scene image.

4. The method according to claim 1, wherein the fifth confidence is obtained by:

determining a shortest distance vector between each of the candidate objects and the rest each of the candidate objects based on three-dimensional position information of each of the candidate objects in a three-dimensional scene image corresponding to the current scene; and determining the fifth confidence of the candidate object having each preset position relationship with the rest each of the candidate objects based on a projection length of the shortest distance vector in each preset direction.

5. The method according to claim 1, wherein the asking a question comprises asking a question for the target candidate object, wherein the asked question comprising feature attribute description information of a reference feature attribute, the question being determined by:

filtering out the reference feature attribute from each preset feature attribute based on a twelfth confidence of each preset feature attribute pointing to the target candidate object and the third confidence of the target candidate object having each preset feature attribute; and generating a question comprising the feature attribute description information of the reference feature attribute.

6. The method according to claim 1, wherein the target preset action comprises asking a question, the asking a question comprising asking a question for the target object; and after performing the target preset action, the method further comprises:

in response to receiving answer information for the question, determining a fifth similarity between the received answer information and each preset answer information;

updating the first confidence of each of the candidate objects in the current scene having each preset state based on the fifth similarity; and updating the second confidence of each of the candidate objects being the target object based on the updated first confidence.

7. The method according to claim 1, wherein the target preset action comprises asking a question, the asking a question comprising asking a question for the target object; and after performing the target preset action, the method further comprises:

in response to receiving supplementary description information for the question, updating the second confidence of each of the candidate objects being the target object based on the supplementary description information and the first confidence, and returning to a step of determining the reward information.

8. A computer device, comprising: a processor, a memory and a bus, the memory has machine-readable instructions executable by the processor stored thereon, the processor communicates with the memory through the bus when the computer device is running, and the machine-readable instructions, when executed by the processor, execute the steps of an object grasping method, comprising:

in response to receiving a target object grasping instruction, determining a second confidence of each of candidate objects being a target object based on state description information of the target object comprised in the target object grasping instruction and a first confidence of each of the candidate objects in a current scene having each preset state;

determining a target candidate object and a reward information after performing each preset action for the target candidate object based on the second confidence and the first confidence corresponding to each of the candidate objects, the preset action comprising grasping the target candidate object and asking a question; and determining a target preset action to be performed based on the reward information corresponding to each preset action, and performing the target preset action for the target candidate object, wherein the first confidence comprises a third confidence of each candidate object having each preset feature attribute, a fourth confidence of each candidate object being located in different preset position areas, and a fifth confidence of each candidate object having each preset position relationship with each of remaining candidate objects, and wherein the determining the second confidence of each of the candidate objects comprises:

determining a sixth confidence of each of the candidate objects being the target object based on a target feature attribute comprised in the state description information of the target object and the third confidence of each of the candidate objects having the target feature attribute, determining a seventh confidence of the state description information of the target object comprising a target preset position area based on a second similarity between the state description information of the target object and standard position area description information corresponding to each preset position area, and determining an eighth confidence of each of the candidate objects being the target object based on the seventh confidence and the fourth confidence of each of the candidate objects being located in the target preset position area, determining a ninth confidence of the state description information of the target object comprising a target candidate object based on a third similarity between the state description information of the target object and standard candidate object description information corresponding to each of the candidate objects, determining a tenth confidence of the state description information of the target object comprising a target preset position relationship based on a fourth similarity between the state description information of the target object and standard position relationship description information corresponding to each preset position relationship, and determining an eleventh confidence of each of the candidate objects being the target object based on the ninth confidence, the tenth confidence and the fifth confidence of each of the candidate objects having the target preset position relationship with the rest each of the candidate objects, and determining the second confidence of each of the candidate objects being the target object based on the sixth confidence, the eighth confidence and the eleventh confidence.

9. A non-transitory computer-readable storage medium having a computer program stored thereon, the computer program, when run by a processor, executes the steps of an object grasping method, comprising:

in response to receiving a target object grasping instruction, determining a second confidence of each of candidate objects being a target object based on state description information of the target object comprised in the target object grasping instruction and a first confidence of each of the candidate objects in a current scene having each preset state;

determining a target candidate object and a reward information after performing each preset action for the target candidate object based on the second confidence and the first confidence corresponding to each of the candidate objects, the preset action comprising grasping the target candidate object and asking a question; and determining a target preset action to be performed based on the reward information corresponding to each preset action, and performing the target preset action for the target candidate object, wherein the first confidence comprises a third confidence of each candidate object having each preset feature attribute, a fourth confidence of each candidate object being located in different preset position areas, and a fifth confidence of each candidate object having each preset position relationship with each of remaining candidate objects, and wherein the determining the second confidence of each of the candidate objects comprises:

determining a sixth confidence of each of the candidate objects being the target object based on a target feature attribute comprised in the state description information of the target object and the third confidence of each of the candidate objects having the target feature attribute, determining a seventh confidence of the state description information of the target object comprising a target preset position area based on a second similarity between the state description information of the target object and standard position area description information corresponding to each preset position area, and determining an eighth confidence of each of the candidate objects being the target object based on the seventh confidence and the fourth confidence of each of the candidate objects being located in the target preset position area, determining a ninth confidence of the state description information of the target object comprising a target candidate object based on a third similarity between the state description information of the target object and standard candidate object description information corresponding to each of the candidate objects, determining a tenth confidence of the state description information of the target object comprising a target preset position relationship based on a fourth similarity between the state description information of the target object and standard position relationship description information corresponding to each preset position relationship, and determining an eleventh confidence of each of the candidate objects being the target object based on the ninth confidence, the tenth confidence and the fifth confidence of each of the candidate objects having the target preset position relationship with the rest each of the candidate objects, and determining the second confidence of each of the candidate objects being the target object based on the sixth confidence, the eighth confidence and the eleventh confidence.

10. The computer device according to claim 8, wherein the third confidence is obtained by:

segmenting a two-dimensional scene image corresponding to the current scene to obtain an image area corresponding to each of the candidate objects; and determining the third confidence of the candidate object having each preset feature attribute based on a first similarity between the image area corresponding to the candidate object and description information of each preset feature attribute.

11. The computer device according to claim 8, wherein the fourth confidence is obtained by:

acquiring the two-dimensional scene image corresponding to the current scene; and determining the fourth confidence of the candidate object being located in the each preset position area based on an overlap area between a position range of the candidate object in the two-dimensional scene image and each preset position area in the two-dimensional scene image.

12. The computer device according to claim 8, wherein the fifth confidence is obtained by:

determining a shortest distance vector between each of the candidate objects and the rest each of the candidate objects based on three-dimensional position information of each of the candidate objects in a three-dimensional scene image corresponding to the current scene; and determining the fifth confidence of the candidate object having each preset position relationship with the rest each of the candidate objects based on a projection length of the shortest distance vector in each preset direction.

13. The non-transitory computer-readable storage medium according to claim 9, wherein the third confidence is obtained by:

segmenting a two-dimensional scene image corresponding to the current scene to obtain an image area corresponding to each of the candidate objects; and determining the third confidence of the candidate object having each preset feature attribute based on a first similarity between the image area corresponding to the candidate object and description information of each preset feature attribute.

14. The non-transitory computer-readable storage medium according to claim 9, wherein the fourth confidence is obtained by:

acquiring the two-dimensional scene image corresponding to the current scene; and determining the fourth confidence of the candidate object being located in the each preset position area based on an overlap area between a position range of the candidate object in the two-dimensional scene image and each preset position area in the two-dimensional scene image.

15. The non-transitory computer-readable storage medium according to claim 9, wherein the fifth confidence is obtained by:

determining a shortest distance vector between each of the candidate objects and the rest each of the candidate objects based on three-dimensional position information of each of the candidate objects in a three-dimensional scene image corresponding to the current scene; and determining the fifth confidence of the candidate object having each preset position relationship with the rest each of the candidate objects based on a projection length of the shortest distance vector in each preset direction.

* * * * *